3,761,348
BICOMPONENT FILAMENT
John M. Chamberlin, St. Louis, Mo., assignor to
Monsanto Company, St. Louis, Mo.
No Drawing. Continuation of application Ser. No. 92,904,
Nov. 25, 1970, which is a continuation-in-part of application Ser. No. 826,020, May 19, 1969, both now abandoned. This application Feb. 17, 1972, Ser. No. 227,259
Int. Cl. A41b 1/00; D02g 3/02; D03d 15/00
U.S. Cl. 161—173
14 Claims

ABSTRACT OF THE DISCLOSURE

A helically crimped bicomponent textile filament and textile products made therefrom are provided. One component is composed of an elastomeric polyurethane melt spinnable at a temperature of about 205°–240° C. and containing a block polyurethane segment melting higher than about 200° C. and below about 235° C. The other component is composed of a polymeric linear hydroxy carboxylic acid ester having a melting point in the range of 180°–240° C.

BACKGROUND OF THE INVENTION

This is a continuation of application Ser. No. 92,904, filed Nov. 25, 1970, now abandoned, and which is a continuation-in-part of my copending application Ser. No. 826,020, filed May 19, 1969, now abandoned.

For many years it has been known to make textile filaments through the conjugation of two polymeric materials having dissimilar shrinkage or heat retraction characteristics. The fusion of the two substances is accomplished by bringing them together at or near the point of filament formation without intimate mixing so that the substances adhere to each other along the length thereof to form a continuous interface. This is known as a side-by-side arrangement of dissimilar polymers to a conjugate filament. A second method of conjugating such dissimilar polymers into a filament is to bring the polymers together at or near the point of spinning to provide in a continuous manner an eccentric core and skin arrangement of the polymers. In both arrangements, core-and-skin or side-by-side, the filaments are potentially crimpable. The crimp is developed after the filaments have been drawn and relaxed; and the crimp takes the form of a non-torque, randomly reversed helix.

Many factors must be considered in the selecting of dissimilar polymers for optimum conjugation. Often it is desirable to have a conjugate filament exhibiting the highest order of contraction or retractive force which is a meaeure of the longitudinally applied force required to remove the helical crimp and to straighten the filament. A side-by-side arrangement of polymer provides a much greater retractive force in the filament as compared with the eccentric sheath-core structures. Unfortunately, the side-by-side conjugate filaments may tend to split into two discrete sub-filaments during processing and use, particularly where the polymers are selected on the basis of the differences in their shrinkages. Another important factor in regards to melt spun conjugated filaments is extrudability of the two selected polymers within a narrow temperature range. When polymers have a desired adherence and contractive force, they normally have such different melting points that expensive and complex equipment is required to maintain the required temperature differential in order to prevent decomposition of the lower melting material and to assure proper conjugation of the polymers. By using the novel conjugation of the components herein described, all the conduits in the melt spinning apparatus may be placed in a single vessel, whose inside temperature, at any given instant, is maintained at the same value throughout the vessel without sacrifice in the properties of the resulting filaments.

SUMMARY OF THE INVENTION

There is provided a novel and useful helically crimped bicomponent textile filament wherein the two components thereof are formed from specific materials. One component is a melt-spinnable fiber-forming polymeric linear hydroxy carboxylic acid ester having a melting point in the range of about 180°–240° C. and recurring structural units of the general formula

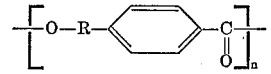

wherein R is a methylene, ethylene, ethoxy or propoxy radical and $n$ is the number of recurring units indicative of the molecular weight. The other component is an elastomeric polyurethane melt spinnable at a temperature of about 205–240° C. and containing a block polyurethane segment melting higher than about 200° C. and below about 235° C. The two components are adherent along the length of the filament either in a side-by-side arrangement or in an eccentric sheath-core arrangement. The polyurethane component comprises about 20–80 weight percent of the fiber structure. The helically crimped filament exhibits a high retractive force when tensioned and a high degree of crimp and crimp uniformity as measured by the difference in the straightened and contracted length of a skein of the filaments.

The invention also includes hosiery knitted of the bicomponent filaments, the hosiery being characterized by excellence of leg fit and high contractile power as well as a high degree of apparent sheerness and durability.

The method of producing the present bicomponent filament comprises melt extruding together the above-described components using conventional conjugate spinning apparatus for accomplishing the conjugation of the components either to produce a side-by-side arrangement of the components or to produce an eccentric sheath-core arrangement thereof. Many melt-spinning spinneret assemblies known in the art can be employed to provide such conjugation. Upon being extruded from the spinneret, the molten conjugated filament or filaments are cooled to solidify the same. This is ordinarily accomplished by contacting the molten stream with a cooling gas. The filaments are stretched to increase the molecular orientation thereof to obtain the desired tensile strength and to provide the contractile force that develops the crimp. The helical crimp dvelops when the stretching force is removed. However, the intensity of the crimp retractive force may be increased and the boiling-water shrinkage of the filament can be reduced by a post-drawing heat treatment wherein the filaments are heated under low tension and then cooled.

DETAILED DESCRIPTION

One of the components used in the manufacture of the present filaments is chosen from the group of fiber-forming polymeric linear hydroxy carboxylic acid esters having a melting point in the range of about 180–240° C. Among suitable members of this group are polymeric p-(2-hydroxyethoxy) benzoic acid, polymeric p-(hydroxymethyl) benzoic acid, polymeric p-(2-hydroxyethyl) benzoic acid and polymeric p-(3-hydroxypropoxy) benzoic acid. The preparation of these polyesters is well known in the art. Homopolymers are usually preferred although copolymers of these polymeric esters may be used provided their melting points are within the cited range and they are extrudable under practicable spinning conditions.

The particular choice of a polymeric ester is somewhat dependent upon the spinning equipment and upon the melting point of the polyurethane component to be used.

The higher melting polyesters are preferably paired with the higher melting polyurethanes, particularly if the temperature of the entire spinning head is controlled at one temperature by a single thermostat. More elaborate spinning heads that provide independent temperature control of each polymer stream to a point just upstream of the spinneret permits a wider choice of polymer pairs, although such apparatus is not normally required.

The molecular weight range of polyesters useful according to the invention may be specified practically by measurement of intrinsic viscosity thereof. Fiber-forming polyesters will have an intrinsic viscosity of 0.3 to 1.5, as determined in metacresol by the standard extrapolation to zero concentration.

The other component used in making the helically crimped filaments is an elastomeric polyurethane melt extrudable at a temperature of about 205–240° C. In combination with the polyester conjugate melt, some polyurethanes not extrudable practically as a homofilament can be spun as a conjugate filament. Filaments extruded at temperatures below 200° C. usually have unsatisfactory physical properties, however, and stick to one another excessively so that the filaments cannot be unwound from bobbins at commercial speeds without excessive tension variations and filament breakage.

A major problem in spinning polyurethane homofilaments is the persistent tackiness of the freshly extruded filaments, surface solidification proceeding at a slow rate. A similar difficulty arises in spinning conjugate filaments with a polyurethane component. It has been found, however, that processing is highly practicable, provided the polymer contains a polyurethane segment melting higher than about 200° C. and below about 235° C., these melting points being measured by differential thermal analysis. These conjugate filaments solidify within a few feet of the spinneret and, with the application of common yarn finish solutions and emulsions, may be wound on bobbins and be processed further.

Either polyester-urethanes or polyether-urethanes are suitable. The polyether component must have an average molecular weight in the range of 800–3000 if excessive tackiness is to be avoided in the conjugate filaments; preferably the molecular weight of the polyether is limited to a range of 800–2500. Polyester-urethanes are usually preferred, being compatible with a wider range of polymeric esters and processing conditions while providing excellent yarn properties.

Because minor variations in chemical structure and physical characteristics are difficult to determine adequately in general, the polyurethanes useful according to the invention are most conveniently described in terms of the chemical reactants used to prepare the polyurethane. Broadly, the polyurethanes are made by reacting together (1) A hydroxy-terminated polyester, or a polyether having an average molecular weight in the range 800–3000; (2) a diisocyanate; and (3) a glycol chain-extending agent.

Suitable polyesters for use in preparing the polyurethane component have a molecular weight in the range of about 1000–3000 and are obtained by the normal condensation reaction of a dicarboxylic acid with a glycol or from a polymerizable lactone. Preferred polyesters are derived from adipic acid, glutaric and sebacic acid which are condensed with a moderate excess of such glycols as ethylene glycol; 1,4-butylene glycol; propylene glycols; diethylene glycol; dipropylene glycol; 2,3-butanediol; 1,3-butanediol; 2,5-hexanediol; 1,3-dihydroxy-2,2,4-trimethylpentane; mixtures thereof; etc. Useful polyesters may also be prepared by the reaction of caprolactone with an initiator such as glycol, preferably with the molecular weight of the product polyester being restricted to the range 1500–2000. Included among suitable polyethers having molecular weights in the range of 800–3000 are poly (oxyethylene) glycol; polyoxypropylene glycol; poly (1,4-oxybutylene) glycol; poly (oxypropylene)-poly (oxyethylene) glycols; etc.

Diisocyanates suitable for the preparation of polyurethanes may be selected from a wide range of chemical classes, such as alicyclic, aromatic, aryl-aliphatic, and aliphatic diisocyanates. Particularly useful diisocyanates are: 2,4-tolylene diisocyanates; 4,4'-dicyclohexylmethane diisocyanate; 4,4'-diphenylmethane diisocyanate; meta or para-xylylene diisocyanate; 1,4-diisocyanato cyclohexane; hexamethylene diisocyanate; and tetramethylene diisocyanate.

Many different common glycols may be used as chain-extending or curing agents. Among these materials are: 1,4-butanediol; ethylene glycol; propylene glycol; 1,4-bis-($\beta$-hydroxyethoxy)benzene. The combination of isocyanate and glycol, both as to type and amount, must be chosen so as to provide a DTA melting point in the range of about 200–235° C.

The chemistry and preparation of elastomeric polyurethanes is treated comprehensively in Polyurethanes; Chemistry and Technology, by J. H. Saunders and K. C. Frisch, Part II, Chapter 9, Interscience Publishers Inc. (1964). U.S. Pat. 3,214,411 issued to Saunders and Piggott may be consulted for specific details on the preparation of polyester-urethanes for filaments according to the present invention.

Particularly advantageous polyester-urethanes may be made by selecting certain specific reactants and combining them within fairly narrow ranges of proportions as indicated by this general recipe:

100 parts by weight of poly (1,4-butylene) adipate having a molecular weight of 1500–2000;

60–110 parts by weight of 4,4'-diphenylmethane diisocyanate; and sufficient glycol to give a total NCO/OH ratio in the range of 1.01–1.04. The preferred chain-extending glycols are ethylene glycol; 1,4-butane diol; and 1,4-bis($\beta$-hydroxyethoxy)benzene which is the glycol represented by the formula

In the above formulation the ratio NCO/OH is an abbreviation for the ratio of equivalents of isocyanate groups to the total equivalents of hydroxy groups in the chain-extending glycol combined with the reactive groups in the polyester. The optimum molecular weight and polymer melt strength for maximum spinning speeds without the breaking of fine denier filaments are obtained when the NCO/OH ratio is in the range of about 1.01–1.04.

The polyurethanes in filaments of the invention, as previously noted, are regarded as block copolymers in which the polyurethane block melts at a temperature above about 200° C. but below about 235° C. This melting point is measured by differenttial thermal analysis (DTA), and is indicated by a distinct endothermic peak in the thermogram as the base temperature of the polymer sample is raised. A general description and discussion of DTA methods is given in Organic Analysis, edited by A. Weissberger, vol. 4, pp. 370–372, Interscience Publisher Inc. (1960), and in various encyclopedias of chemical technology. In the examples cited below, the DTA melting points were measured with a commercial Du Pont 900 DTA Instrument, manufactured by E. I. du Pont de Nemours, Inc.

The two components (polyurethane-polyester) are preferably extruded through single spinneret orifices in side-by-side relation; this arrangement provides the highest order of retractive force to the crimps. However, it is possible to extrude the two components through separate juxtaposed orifices and to coalesce the two extruded streams of molten polymer just below the extrusion face of the spinneret. When a crimp of reduced retractive force can be used a sheath-core structure of the polymers is made, provided that the core is eccentrically arranged with respect to the long axis of the filament. The sheath-core structure is preferred where extremely uniform dyeing in the ultimate textile product is of importance. The two components are preferably present in approximately equal amounts by weight, but the relative amounts of the two components may vary from about 20–80% to 80–20% and a highly crimped structure is assured when at least 30% of the cross section of the spun filament is comprised of the polyurethane component. After extrusion the composite filament must be stretched. The filament can be cold-stretched of, if desirable, be hot-stretched as long as the desired tensile strength is obtained without unduly disrupting the adherence of the two components. After stretching, the filament may be heated under low tensile loading. These relaxing conditions are usually selected to induce the desired low degree of boiling water shrinkage and to heat-set the crimp in the polyester component of the filament. The precise conditions for stretching and relaxation can be selected without undue difficulty.

Filaments according to the invention may be produced with conventional conjugate spinning equipment. The two polymeric components may be melted and supplied to the metering pumps by a grid-melter as disclosed by Le Grand in U.S. Pat. 3,197,813. Screw extruder-melters are preferable, however, because of more positive control of polymer flow. A spinneret assembly as disclosed by Kiser in U.S. Pat. 3,166,788 may be used in which the two polymer streams came together just upstream of the capillary orifices at the spinneret face.

Cooling air is blown across the extruding filaments as they pass vertically down a conventional quenching chimney to a comb-type convergence guide. The filaments are passed over a suitable finish applicator roll to a feed roll and thence to a surface-driven windup bobbin. Any tendency of the filaments to stick together may be effectively reduced by the application of an appropriate liquid finish. One suitable finish is a 10% solution of Union Carbide L–530 organo-silicone copolymer, manufactured by Union Carbide Corp., Silicones Division, 270 Park Avenue, New York, N.Y.; this finish may be applied at a concentration of 3–5% organo-silicone on the filaments.

The spun conjugate filaments may be drawn on conventional drawtwisters and drawwinders.

Example 1

A polyurethane is made by reacting together a mixture of 100 parts by weight of a hydroxy-terminated polyester having a molecular weight of about 2000 prepared from 1,4-butylene glycol and adipic acid having hydroxyl number of 53 and acid number 1.5, 60 parts by weight of 4,4'-diphenylmethane diisocyante, and about 38 parts by weight of 1,4-bis(β-hydroxyethoxy)benzene, the reactants being exactly chosen such that there is 1.03 isocyanate group for each 1.0 hydroxy group. The intimate mixture of reactants is prepared at 100° C., cast upon heated trays at 130° C., and cured into a solid mass that is subsequently chopped into flakes with a rotary cutter. The specific viscosity is 0.72, measured as 0.4% solution of polyurethane in dimethyl acetamide containing 0.4% of lithium chloride at 25° C. A finely divided representative sample has a melting point of about 225° C. determined by DTA.

The fiber-forming polyester component is prepared by heating p-(2-hydroxyethoxy) benzoic acid at 220° C. in a vessel through which nitrogen is bubbled. After one hour, the temperature of the molten mass is raised to 250° C. and maintained for an additional hour. The pressure is then reduced to 0.3 mm. of mercury; and the heating is continued at 250° C. for five additional hours. The resulting polymer is extruded, cooled, and broken into chips. The DTA melting point of the resulting polyethylene oxybenzoate is 205° C.

The polyurethane chips are then charged to the feed hopper of one extruder-melter and the polyethylene oxybenzoate pellets are charged to the other. The metering pump speeds are set to deliver the two melts in the ratio of 1:1 by volume at a spinning speed of 300 y.p.m. Spinning proceeds quite smoothly with essentially no tackiness in the conjugate filaments. As they are spun the filaments are wound up separately as monofilaments on a pair of surface-driven bobbins, five cakes per bobbin. A large number of full-sized spin cakes are collected for subsequent treatament. Other essential spinning conditions are:

| | |
|---|---|
| Melt-extruder outlet temperature ° C | 220 |
| Spining block temperature ° C | 220 |
| Capillary orifice diameter mils | 25 |
| Spun denier per filament | 105 |
| Percent finish on yarn | 3.5 |

Upon being hand-drawn and released, spun filaments immediately contract into closed helical coils. A skein is wound on a denier reel carefully to avoid predrawing, and is placed in boiling water for 5 minutes. After being dried and conditioned, the undrawn skein is measured and found to have shrunk about 2.5%, but the filaments remain straight and uncrimped. When hand-drawn 300–400%, the preshrunk spun filaments immediately contact into a series of close helices.

Example 2

The spinning run outlined in Example 1 is continued except that the proportion of polyethylene oxybenzoate is polyurethane is varied by changing the relative speeds of the metering pumps; only minor compensating changes in spinning block temperature are required. Several full size spincakes each are collected of filaments containing 25%, 35%, and 65% polyurethane. Each of the latter two filaments contracts into close helical coils when hand-drawn. Filaments containing 25% polyurethane contract into a loose open helix.

These spincakes and those produced in Example 1 are stocked on a standard drawtwister operated at a machine draw ratio of 4.05 and with a yarn speed of 585 y.p.m. Each filament makes one 360° wrap around a standard ⅜ inch drawpin that tends to localize the draw zone. At several drawtwister positions the filament leaving the draw roll is passed axially through a heated stainless steel tube 9 inches long by ½ inch diameter into which preheated air is passed cocurrent with the moving filament. The air temperature is controlled at 140° C. and the filament is wound up at 35% underdrive; thta is, the filament emerges from the tube at 35% lower speed than it entered. This reheated yarn is referred to as "prebulked."

Several skeins of each item of freshly drawn yarn are unwound from the bobbins in preparation for subsequent checks of shrinkage and percent bulk. Except for the skeins containing 25% polyurethane, the filaments in the loose skeins slowly contract into close helices after about 30 minutes. The "prebulked" sample, however, contract much more slowly and acquire only a loose open helical form after several hours. All of these skeins are exposed to boiling water and conditioned as previously.

Example 3

The procedure outlined in Example 1 is followed using 100 parts by weight of polyester prepared from 1,4 butylene glycol and adipic acid and having a molecular weight of about 2000, hydroxyl number 55, and acid number 1.5; 90 parts by weight of 4,4'-diphenylmethane diisocyanate; and about 27 parts by weight of 1,4-butanediol, the exact ratio being chosen to an NCO/OH ratio of 1.02. The resulting blended polyurethane chips have a DTA melting point of about 220° C. and a specific viscosity of 1.19. Filaments are readily spun conjugately with fiber-forming polyethylene oxybenzoate. The conjugate yarns process readily without objectionable sticking. Yarn properties of both types of filaments are quite comparable to those of filaments produced in Example 1.

Example 4

The procedure and recipe in Example 3 is followed except that a polyester from ε-caprolactone with hydroxyl number 54 is substituted. The resulting polyurethane has a DTA melting point of about 215–220° C., and can be melt spun conjugately quite satisfactorily with polyethylene oxybenzoate without sticking.

Example 5

The procedure of Example 3 is followed except that instead of the polyester, a poly (1,4-oxybutylene) glycol of about 1500 molecular weight and having a hydroxyl number of 70 is used. The resulting polyurethane has a DTA melting point of about 220–225° C. This polyurethane can be satisfactorily melt spun conjugately with fiber-forming polyethylene oxybenzoate.

Example 6

The procedure in Example 5 is followed except that a poly (1,2-oxypropylene) glycol with molecular weight of about 2000 and having a hydroxyl number of 55 is used. The polyurethane product has a DTA melting point of about 210–215° C. and is melt spinnable conjugately with polyethylene oxybenzoate without excessive sticking or break backs in spinning.

From the preceding discussion it is evident that filaments according to the invention have many technical and practical advantages compared with stretch filaments of the prior art, principal advantages deriving from the high level of contractile power recovery as well as extension recovery in fabrics. Although not emphasized previously, it is notable that the polyurethane component readily accepts basic dyes while being resistant to acid dyes. The polyester component accepts basic dyes less readily. Union dyeing of the components within the filament or in combination with other fibers within a fabric is readily achievable and micro-scale cross-dyeing effects are feasible.

I claim:

1. A helically crimped bicomponent textile filament wherein the two components thereof are continuous along the length thereof and are substantially adherent to each other characterized by one component being a melt-spinnable fiber-forming polymeric linear hydroxy carboxylic acid ester having a melting point in the range of about 180°–240° C. and recurring structural units of the general formula

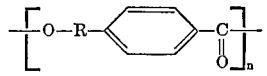

wherein R is methylene, ethylene, ethoxy or propoxy radical and $n$ is the number of recurring units indicative of the molecular weight, and the other component being an elastomeric polyurethane melt spinnable at a temperature of about 205°–240° C. and containing a block polyurethane segment melting higher than about 200° C. and below about 235° C.

2. The filament of claim 1 wherein the polymeric ester is a member selected from the group consisting of polymeric p-(2-hydroxyethoxy) benzoic acid, polymeric p-(hydroxymethyl) benzoic acid, polymeric p-(2-hydroxyethyl) benzoic acid and polymeric p-(3-hydroxypropoxy) benzoic acid.

3. The filament of claim 1 wherein the said polyurethane is the reaction product of about 100 parts by weight of poly (1,4-butylene) adipate having a molecular weight of about 2000, 80 to 90 parts by weight of 4,4'-diphenylmethane diisocyanate, and sufficient 1,4-butanediol to provide a NCO/OH ratio of 1.01–1.04.

4. The filament of claim 1 wherein the said polyurethane is the reaction product of 100 parts by weight of poly (1,4-butylene) adipate having a molecular weight of about 2000, 60 to 110 parts by weight of 4,4'-diphenylmethane diisocyanate, and sufficient glycol to provide a total NCO/OH ratio in range 1.01 to 1.04, said glycol being a member selected from the group consisting of ethylene glycol, 1,4-butanediol, and the glycol represented by the formula

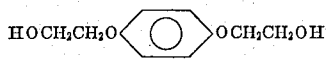

5. The filament of claim 1 wherein the said polyurethane is the product of reacting together 100 parts by weight of poly (1,4-butylene) adipate having a molecular weight of about 2000, 60 parts by weight of 4,4'-diphenylmethane diisocyanate, and about 38 parts by weight of the glycol represented by the formula

at an NCO/OH ratio of about 1.01–1.04.

6. A helically crimped bicomponent textile filament wherein the two components are continuous along the length thereof and are essentially adherent to each other characterized by one of said components being fiber-forming polymeric p-(2-hydroxyethoxy) benzoic acid, and the other component being a polyester-urethane made with a diphenylmethane diisocyanate and melt spinnable at a temperature of about 205°–240° C.

7. The filament of claim 1 wherein the two components are in side-by-side arrangement along the length thereof.

8. The filament of claim 1 wherein the two components are in eccentric sheath-core arrangement along the length thereof.

9. The filament of claim 1 wherein the polyurethane component composes about 20–80% by weight of the filament structure.

10. A knitted fabric comprised of filaments defined by claim 1.

11. A woven fabric comprised of at least 20% by weight of filaments as defined by claim 1.

12. A helically crimped bicomponent textile filament wherein the two components thereof are continuous along the length thereof and are substantially adherent to each other characterized by one component being a melt-spinnable linear polyester having a melting point in the range of 180°–240° C. and the other component being an elastomeric polyurethane melt spinnable at a temperature of about 205°–240° C. and containing a block polyurethane segment melting higher than 200° C. and below about 235° C.

13. A lady's hose comprising a filament as defined in claim 12.

14. A filament as defined in claim 12, wherein said polyurethane component is dyed with a basic dye.

References Cited

UNITED STATES PATENTS

| | | | |
|---|---|---|---|
| 2,600,376 | 6/1952 | Caldwell | 260—78.3 |
| 3,214,411 | 10/1965 | Saunders et al. | 139—420 |

FOREIGN PATENTS

| | | | |
|---|---|---|---|
| 780,597 | 3/1968 | Canada | 161—173 |

GEORGE F. LESMES, Primary Examiner

L. T. KENDELL, Assistant Examiner

U.S. Cl. X.R.

66—202, 178; 139—420; 161—175, 177; 264—171; 260—47 R, 75 NP, 78.3, 77.5 AM; 8—15